(No Model.)
2 Sheets—Sheet 1.
J. A. MENGEL.
SEED PLANTER.
No. 577,486.　　　　　　　　　Patented Feb. 23, 1897.
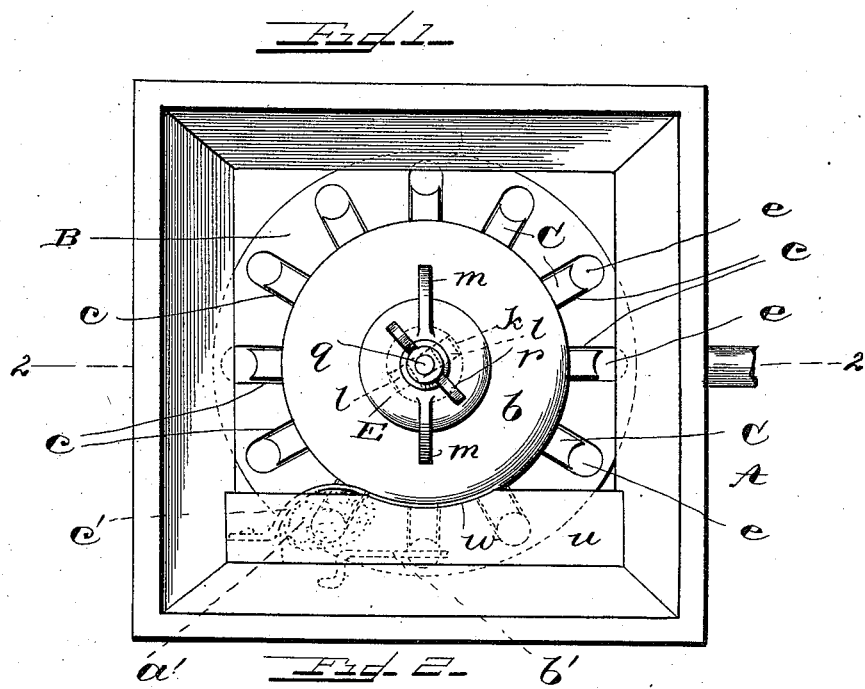
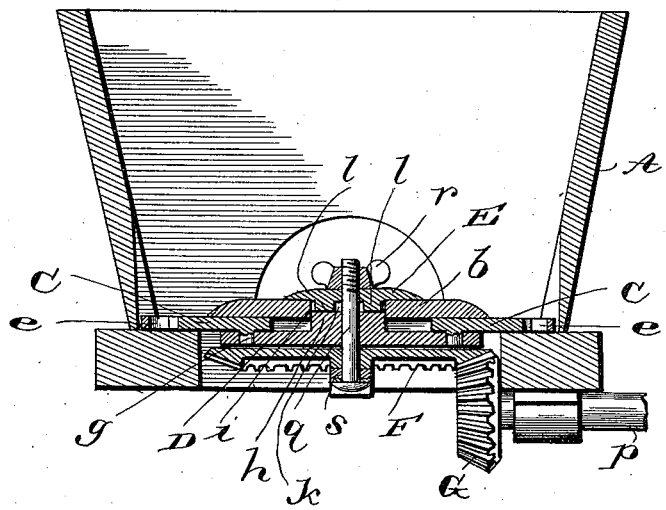
Witnesses
　　　　　　　　　　　　　　Inventor
　　　　　　　　　　　　　　Joseph A. Mengel
　　　　　　　　　　　　　　By D. C. Reinöhl
　　　　　　　　　　　　　　　Attorney.

(No Model.) 2 Sheets—Sheet 2.
J. A. MENGEL.
SEED PLANTER.
No. 577,486. Patented Feb. 23, 1897.
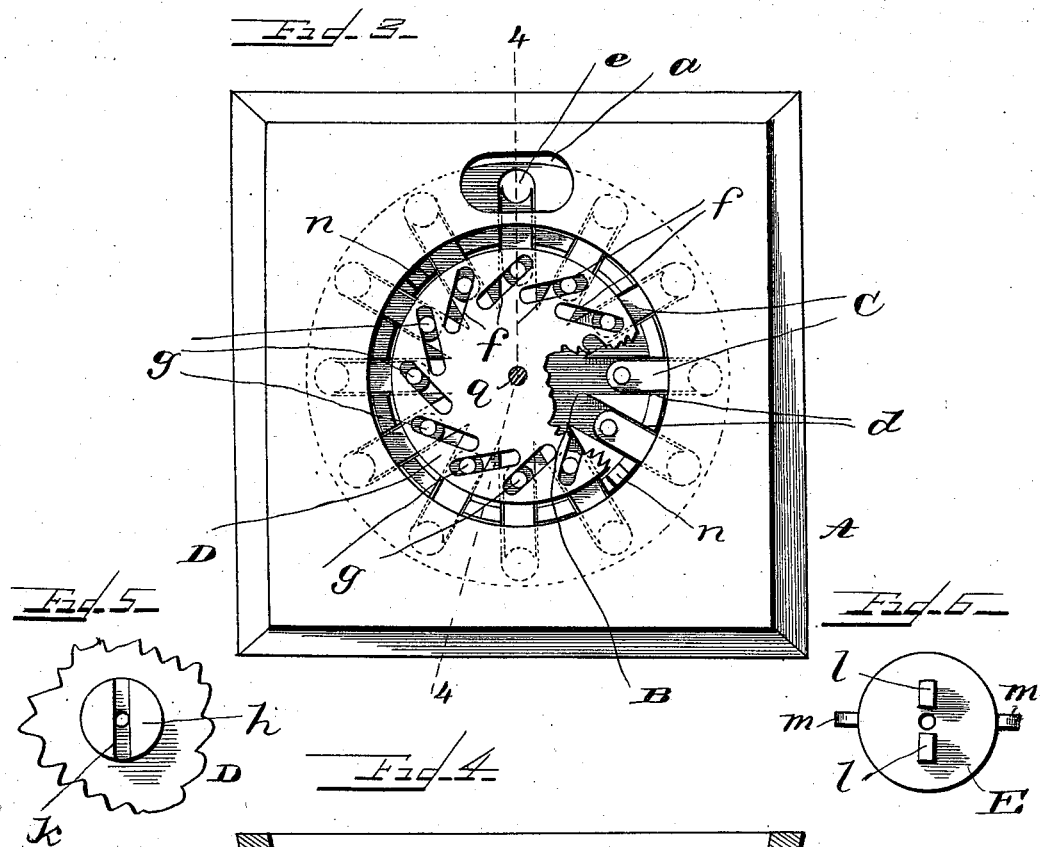
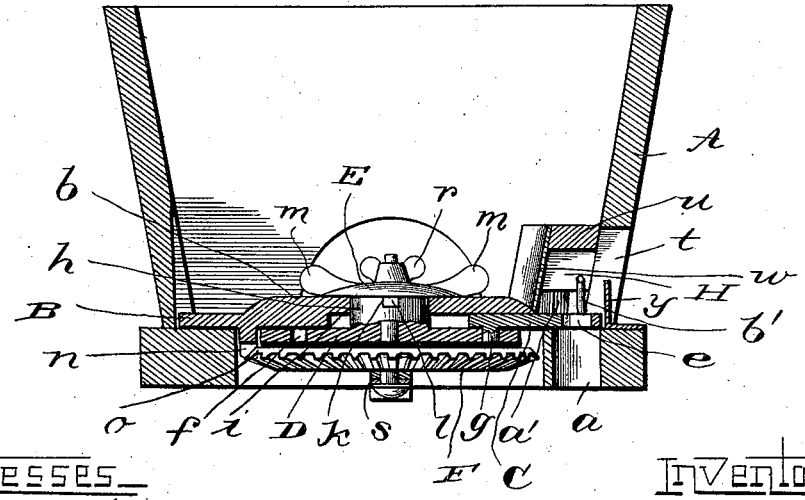
Witnesses
Inventor
Joseph A. Mengel

UNITED STATES PATENT OFFICE.

JOSEPH A. MENGEL, OF McKEANSBURG, PENNSYLVANIA, ASSIGNOR OF TWO-THIRDS TO GEORGE H. GERBER, OF POTTSVILLE, AND GEORGE K. BINKLEY, OF ORWIGSBURG, PENNSYLVANIA.

SEED-PLANTER.

SPECIFICATION forming part of Letters Patent No. 577,486, dated February 23, 1897.

Application filed May 5, 1896. Serial No. 590,294. (No model.)

*To all whom it may concern:*

Be it known that I, JOSEPH A. MENGEL, a citizen of the United States, residing at McKeansburg, in the county of Schuylkill and State of Pennsylvania, have invented certain new and useful Improvements in Seed-Planters; and I do hereby declare the following to be a full, clear, and exact description of the invention, such as will enable others skilled in the art to which it appertains to make and use the same.

My present invention relates to seed-planters, and has for its object certain improvements in construction, which will be fully disclosed in the following specification and claims.

In the accompanying drawings, which form part of this specification, Figure 1 represents a top plan view of my improved seed-planter; Fig. 2, a vertical transverse section on the line 2 2, Fig. 1; Fig. 3, an inverted plan view with the driving-gear removed; Fig. 4, a vertical section on line 4 4, Fig. 3; Fig. 5, a top plan view of the hub of plate D, and Fig. 6 an inverted plan view of the adjusting-disk.

For the purpose of illustration I have shown the hopper and the feed mechanism only, as they can be mounted upon wheels or attached directly to a cultivator.

Reference being had to the drawings and the letters thereon, A indicates a hopper provided with a discharge-opening $a$ on one side of the bottom thereof, and from which opening a suitable seed-conductor (not shown) extends to the ground for conducting seed into furrows, and upon said bottom rests a horizontal circular plate B, provided with a raised or thickened center $b$, radial slots $c$, and radial guideways $d$ in the under side of the thickened portion to receive the feeding-arms C, which work in said slots and guideways to regulate the size of the seed-spaces $e$ between the outer ends of the arms C and the outer ends of the slots $c$, as shown.

Under the plate B is a circular plate D, provided with cam-slots $f$, set at an angle to the axis of the plate, and with which the studs or pins $g$ on the feeding-arms C engage, and by which slots they are projected outward from or retracted inward toward the center of the plate B to regulate the size of the seed-spaces $e$, and with a hub $h$, which enters the opening $i$ in the center of the plate B and is provided with a transverse slot or seat $k$ in its upper end to receive the spline $l$ on the circular disk E, which rests upon the upper side of the raised portion $b$ of the plate B. The disk E is provided with vertical projections $m$ $m$, by which the disk is revolved axially to revolve the plate D and project or retract the feeding-arms C.

Under the plate D is a miter gear-wheel F, which is connected to the plate B by lugs $n$, projecting from the under side of the plate and engaging slots $o$ in the rim of the wheel, or by any suitable means to cause the plates B and D and the feeding-arms to revolve as the gear-wheel F is revolved by the pinion G, to which power is transmitted by shaft $p$, which may be driven in any approved manner common to this class of machines.

The gear-wheel F, the plates D and B, and the disk E when properly assembled are secured together by a bolt $q$, passing through the center of each, and a nut $r$, which rests upon the disk E and serves to lock the feeding-arms C in any desired and predetermined position, the gear-wheel F resting upon a suitable support $s$.

One of the sides of the hopper A is provided with an opening $t$, and on the inside of the hopper and over said opening is a block $u$, extending across the hopper, cut away to form a seed-chamber H, from which the seed carried in the spaces $e$ passes through the opening $a$ into the conductor, to be deposited in a furrow. The inner side of the said seed-chamber is closed, as shown at $w$ in Fig. 4, and outside of the periphery of the plate B, as it passes through the seed-chamber H, is a guard or fender $y$ to prevent seed wasting out of said chamber.

On one end of the block $u$ is a brush $a'$, which extends down and bears upon the slotted portion of the plate B to prevent more seed than can enter the seed-spaces $e$ being carried into the seed-chamber H to be planted, and to secure the positive discharge of the seed contained in each space $e$ a spring $b'$ may be secured to the hopper to extend into the seed-chamber over the spaces as they pass over the opening $a$ to push the seed out of the spaces into said opening.

The brush may be secured on the block by means of a metallic strip $c'$.

By the adjustment of the feeding-arms C the seed-spaces $e$ may be regulated to receive and convey any desired number of seed within the capacity of the spaces and may be readily changed to suit the kind of seed to be planted, and the feeding mechanism and its driving-gear are supported within and upon the bottom of the hopper, so that they are out of the way and cannot be injured by contact with extraneous objects.

Having thus fully described my invention, what I claim is—

1. In a seed-planter, a horizontal plate having radial slots in the outer portion thereof, guideways in the under side and inner portion thereof, and feeding-arms engaging said slots and guideways and a gear-wheel connected to said plate, in combination with a cam-plate connected to said arms, and means for adjusting the arms.

2. In a seed-planter, a horizontal plate resting upon the bottom of the hopper and provided with radial slots and guideways and a central opening, and feeding-arms engaging said slots and guideways and a gear-wheel connected to said plate, in combination with a plate having cam-slots connected to said arms, a hub, an adjusting-disk and a clamping-nut.

3. In a seed-planter, a horizontal plate thickened in its center and provided with radial slots through the plate beyond said thickened part and radial grooves in the under side of the thickened part, a gear-wheel connected to said plate, a plate having cam-slots, and feeding-arms between said plates and engaging said slots and grooves, in combination with an adjusting-disk and a clamping-nut.

4. In a seed-planter, a hopper having a seed-opening in its bottom, a seed-chamber formed at one side of the hopper, a revoluble plate provided with radial slots in the outer portion and radial guideways in the under side and inner portion and with seed-spaces and means for varying the capacity of said spaces, in combination with a device for removing excess of seed from said spaces, and a gear-wheel connected to said plate.

In testimony whereof I affix my signature in presence of two witnesses.

JOSEPH A. MENGEL.

Witnesses:
GEORGE H. GERBER,
W. L. KRAMER.